United States Patent

Ford et al.

Patent Number: 5,741,588
Date of Patent: Apr. 21, 1998

[54] CARBON FIBERS FOR ENHANCING THE ELECTRICAL CONDUCTIVITY OF A PRODUCT

[75] Inventors: Joseph Thomas Ford, Chester; Dennis Walter Gallimore; Stephen John Gallimore, both of Merseyside, all of United Kingdom

[73] Assignee: Solatrim Limited, Clwyd, Wales

[21] Appl. No.: 513,629

[22] Filed: Aug. 10, 1995

[30] Foreign Application Priority Data

Mar. 31, 1995 [GB] United Kingdom ............... 9506715

[51] Int. Cl.$^6$ .................... B32B 9/00; H01M 4/86
[52] U.S. Cl. .................. 428/367; 428/359; 428/361; 428/403; 428/408; 423/447.1; 429/44; 429/45
[58] Field of Search ................ 428/367, 375, 428/408, 359, 361, 403; 429/44, 45; 423/447.1

[56] References Cited

FOREIGN PATENT DOCUMENTS

| 59-144679 | 8/1984 | Japan . |
| 3071568 | 3/1994 | Japan . |
| 6116396 | 4/1994 | Japan . |
| 6255015 | 9/1994 | Japan . |

*Primary Examiner*—Patrick Ryan
*Assistant Examiner*—J. M. Gray
*Attorney, Agent, or Firm*—Dennison, Meserole, Pollack & Scheiner

[57] ABSTRACT

An electrode for an accumulator or cell includes electrically conductive chopped carbon fibers which are coated with a surfactant. Preferably, the carbon fibers are chopped crystal carbon fibers having a diameter of about 4 to 7 micrometers, chopped length of about 0.5 to 3.00 mm and a volume resistivity of about $0.5 \times 10^{-3}$ to $2.0 \times 10^{-3}$ ohm cm.

19 Claims, 1 Drawing Sheet

TYPICAL CROSS SECTION OF LEAD GRID. LEAD OXIDE IS PASTED ACROSS GRID. FIBRES ARE ADDED TO OXIDE AND THEN PASTED AS NORMAL.

DETAIL OF CRYSTAL FIBRES BROKEN DOWN INTO INDIVIDUAL FILAMENTS DISPERSED THROUGHOUT OXIDE. EACH FIBRE TOUCHES EACH OTHER AND MAKES A CONDUCTIVE NETWORK WITHIN EACH SQUARE SHOWN AND ACROSS GRID.

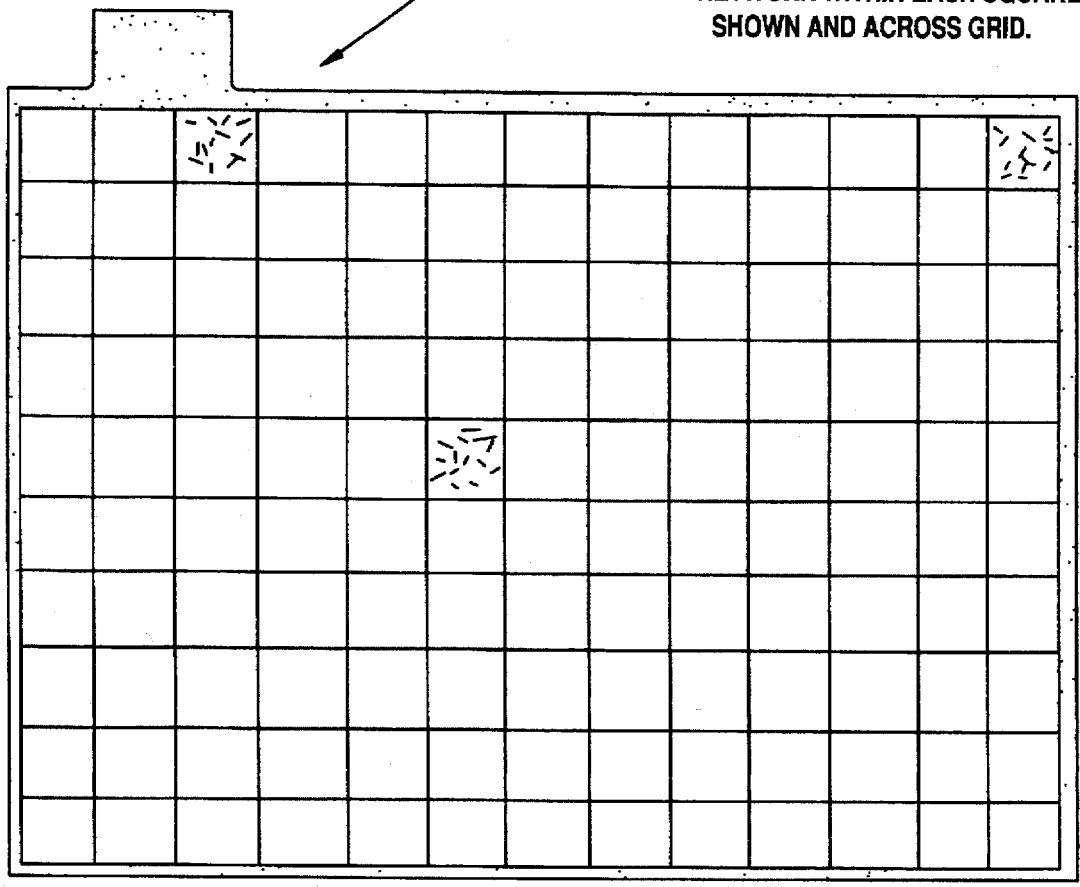

CARBON FIBERS FOR ENHANCING THE ELECTRICAL CONDUCTIVITY OF A PRODUCT

BACKGROUND OF THE INVENTION

The present invention relates to an electrically conductive additive formed of chopped carbon fibres and particularly although not exclusively suitable for use in a coating for an electrode of a secondary cell or accumulator, although may form the electrode per se and may have other uses such as an additive for glues and adhesives.

In the production of lead-acid accumulators/secondary cells, it is known to form the positive electrode or plate by coating a lead matrix or lead-alloy matrix with a lead oxide paste or like which when immersed in sulphuric acid and in use converts to lead sulphate and with such process being reversible. It is known to improve the constructional strength of the lead oxide paste by incorporating relatively long and large polyester or acrylic fibres (non-electrically conductive) and such may also increase the bonding to the grid or matrix.

When bonded in suitable resins, carbon fibre is known to provide articles of considerable strength. It is also known that carbon fibres are electrically conductive.

In the production of paper sheets or veils which are subsequently to be applied in layers bonded together by resin, it is known to form such veils from chopped carbon fibres of relatively long lengths of 6 to 9 mm which are randomly disposed and held together by frictional engagement and possibly plus additional bonding means and for use in providing constructional strength and not for its electrically conductive characteristics. It is also known to utilise long lengths of carbon fibres which are woven together to form a woven fabric which is then bonded, for example for aerospace purposes. Such fibres have a relatively high volume resistivity of $1.5 \times 10^{-3}$ ohm cm although such woven fabrics are not used for their electrical conductivity characteristics.

SUMMARY OF THE INVENTION

It has been discovered that in a lead acid accumulator the formation of the positive electrode or plate of a lead or lead alloy coated with a paste of lead oxide incorporating randomly dispersed carbon fibres preferably crystal carbon fibres provides not only for increased strength but also for considerably improved efficiency in that there is a reduction in the internal resistance of the cell which is probably as a result of the increased conductivity in the paste and/or between the paste and the carrier plate/electrode and that also an increased potential difference is achieved.

Thus, according to the present invention there is provided an accumulator or cell wherein at least the positive electrode is formed from or is coated with a paste or other coating containing an electrically conductive additive comprising chopped carbon fibres.

Preferably the carbon fibres are crystal carbon fibres and which are a particularly pure form of carbon.

Preferably carbon fibres having a low aspect ratio will be utilised, i.e. having small diameter and of short length, and preferably of high electrical conductivity. Preferably the fibres will have been coated with a surfactant and preferably an anionic surfactant preferably prior to chopping so as to enhance dispersion relative to its carrier medium, which in the case of lead oxide paste will mean a water surfactant is utilised such as "LANKROPOL KO2" (Trade Mark) marketed by Akcros Chemicals of Eccles, Manchester although any other suitable surfactant may be used.

BRIEF DESCRIPTION OF THE DRAWING

FIG. 1 is a cross-section of a lead grid electrode including a lead oxide paste containing carbon fibers according to the invention.

DETAILED DESCRIPTION OF THE INVENTION

The accumulator or cell of the invention has not been proposed hitherto and possesses considerable advantages.

Lithium cells are known and the present invention also proposes replacing at least the cathode thereof with a cathode formed of chopped carbon fibres which may be held together by sintering or other bonding means. Other electrodes or articles formed from chopped carbon fibres, particularly those as subsequently defined, are intended to be covered by the present invention.

Also according to the present invention an electrically conductive additive for lead oxide or other pastes for coating electrodes comprises chopped carbon fibres and preferably chopped carbon fibres having a lower aspect ratio than known hitherto and/or preferably chopped carbon fibres which have previously been coated with a surfactant and preferably an anionic surfactant.

Also according to the present invention there is claimed the use of chopped carbon fibres for the manufacture of electrodes for use in accumulators or secondary cells and preferably the novel chopped carbon fibres defined herein.

Also according to the present invention an electrically conductive additive for use in the manufacture of electrodes comprises chopped carbon fibres having a low aspect ratio and previously having been coated with a surfactant.

Preferably the fibres will have a diameter of 4–7 micrometers and a chopped length of 0.5 to 3.00 mm and preferably within a range of 0.5 to 1.5 mm to maintain the low aspect ratio of the fibres. Preferably the carbon fibre will be crystal carbon fibre and will preferably have a particularly high electrical conductivity, for example, a low volume resistivity value in the region of $0.50 \times 10^{-3}$ ohm cm to $0.90 \times 10^{-3}$ ohm cm or even up $2.0 \times 10^{-3}$ ohm cm.

Preferably 0.15% by weight of the positive active mass (lead dioxide) will be carbon fibre. In other words, 1.5 kilo of carbon fibre mixed in water will be added to each ton of lead dioxide to form the paste.

It is most important that the carbon fibres be initially coated with a surfactant and such is preferably achieved by running the long strands of carbon fibre through the liquid surfactant prior to chopping or cutting such to the required length. Once coated with the surfactant, the carbon fibre strands have reduced abrasion resistance and any excess surfactant may then be wiped off to control the moisture content, which is of significance. Also, the carbon fibres are preferably chopped whilst still wet with surfactant. The fibres are coated with a surfactant so as to enhance the dispersion of the chopped fibres in water when such are to be dispersed in a lead oxide paste in the formation of a coating for the positive electrode of an accumulator (although any suitable surfactant may be utilised). Preferably an anionic surfactant such as sodium dioctyl sulphosuccinate and ethanol such as sold by Akcros Chemicals of Eccles, Manchester under their Trade Mark "LANKROPOL KO2". If such chopped fibres are to be dispersed in other carriers, then other suitable surfactants will be utilised. For instance, if the chopped fibres are to be used as an additive in adhesives to give increased strength and electrical conductivity, then the fibres will be coated with a surfactant so as to be dispersible in the adhesive mix. Thus, the surfactant should be compatible with and cooperable with the carrier with which the carbon fibres are to be dispersed and the surfactant enhances the dispersion so as to provide for good conductivity and also adequate strength. It is to be noted that once the dispersion has taken place it does not necessarily subsequently matter whether the surfactant remains or is dissipated in the subsequent usage of the final product.

If the chopped fibres are to be utilised to form the actual electrode per se then the surfactant might be useful in forming the necessary structure in any sintering or any other compacting or consolidating process.

It is also intended that the present invention be broad enough to cover the novel chopped carbon fibres defined herein and/or the use of such in or on or as part of the electrode of a secondary cell or accumulator or for that matter in any other product such as incorporated in plastics materials sheets or structures or incorporated in a resin or glue or other bonding agent to improve the electrically conductivity thereof or in any other use for such purpose.

It is to be appreciated that the low aspect ratio of the chopped carbon fibres is of significance. Utilisation of the fibres in the secondary cell reduces the internal resistance in the cell by increasing the electrical conductivity in the paste and/or between the paste and the carrier plate/electrode and also increases the potential difference across the cell.

It is desirable for the carbon fibre to have the highest possible electrical conductivity and the shortest length.

The electrode of a secondary cell may even comprise a plastics plate incorporating carbon fibres disclosed herein and preferably ones at least initially having a surfactant applied thereto prior to chopping.

The preferred embodiments of the invention present the following advantages:

1. The preferred 1 mm length fibre is totally stable in life cycle tests to the death of the battery. This goes against electro-chemistry theory which suggests that carbon fibre will show advantages in the first few cycles of the battery life but will oxidate and disappear all together as the oxidating effect continues at the positive.

2. There is a large increase on the graviometric energy density of the cell over a conventional lead acid cell. This means that the watts/kg/hr output can be closer to the theoretical maximum energy density of the cell.

3. The fibres improve the strength and handling capability of the positive electrode paste and because of the conductivity thereof, increase or optimize the utilization of the paste. The paste within the positive electrode lead grid tends to crumble but the carbon fibres with their high strength prevent this happening.

The invention will be described further, by way of example, with reference to FIG. 1 which is a cross section of a lead grid electrode to which lead oxide paste containing crystal carbon fibres according to the invention has been applied across the grid (only details of three squares of the grid having paste thereover with the fibres therein being schematically illustrated). The crystal fibres are broken down/dispersed into individual filaments throughout the oxide paste with many of the fibres touching one another to provide a constructive network within each square shown and across the grid.

A carbon fibre is utilised which is preferably 99.999% pure graphite and is carbonised to a diameter of 5 micrometers or less. The fibre is then coated with a water surfactant at a percentage by volume or weight of water and then chopped to a length of approximately 1 mm. The fibres remain as small bundles which flow like sand when handled but which disperse completely in water and remain dispersed upon agitation. This is extremely difficult to achieve and requires sophisicated equipment as is designed by Applicants.

It is believed the surfactant coating applied may possibly act as a protective layer and prevents the carbon fibre oxidating in an accumulator.

The invention further presents the following advantages:

1. Increased plate conductivity

Lead oxides are pasted to lead grids to form positive plates. There are difficulties in ensuring that the oxides transmit all of their electro chemical energy potential to the grids. Lead acid cell have a THEORETICAL MAXIMUM ENERGY DENSITY which is achievable assuming all the active surface oxide can be utilised during charge and discharge/cycles of the cell. In practice this is seldom or never achieved, due to losses in, internal resistance of the cell. Crystal carbon fibres are extremely conductive. These fibres of well dispersed across positive active material provide excellent grid formation within the paste itself creating a conductive network inside the active material which touches the real grid itself again increasing plate conductivity and increasing the amount of active surface oxide which can be utilised thus increasing energy density of the cell.

2. Reduced flaking and improved processibility

The manufacture, life, mechanical strength of the positive plates is vastly improved by the presence of these fibres. This is perhaps one of the messiest operations within the battery factory. Lead oxide waste is expensive, and controlled plate thickness and weight is difficult to achieve, but essential to the manufacture of all good lead acid batteries, and more so to valve regulated lead acid batteries or bi-polar to be used in future E.VS.

3. Increased plate porosity

The fibres increase the porosity of the positive plate and therefore it is found increase or utilise more the active surface area of the plate and increase the energy density of the cell. The crystal fibres utilised do not oxidate and are totally chemically inert to the severe oxidating environment of lead acid cells, they are totally stable and show no signs of oxidation or degradation under electron microscope.

What is claimed is:

1. Crystal carbon fibers for enhancing electrical conductivity having a diameter of about 4 to 7 micrometers and chopped to a length of about 0.5 to 3.00 mm, said fibers being coated with a surfactant prior to chopping to said chopped length.

2. Carbon fibres according to claim 1, wherein the fibres have a length of 0.5 to 1.5 mm.

3. Carbon fibres according to claim 1 having a volume resistivity value of about $0.5 \times 10^{-3}$ to $2.0 \times 10^{-3}$ ohm cm.

4. Carbon fibres according to claim 3 having a length of 0.5 to 1.5 mm.

5. Carbon fibres according to claim 4 wherein the surfactant comprises an anionic surfactant.

6. Carbon fibres according to claim 5, wherein the surfactant comprises dioctyl sulphosuccinate and ethanol.

7. Carbon fibers according to claim 1, wherein the carbon fibers are dry.

8. Carbon fibers according to claim 1, comprising chopped bundles of filaments.

9. Carbon fibers according to claim 1, in the form of an electrode for an accumulator or cell.

10. Chopped crystal carbon fibers for enhancing electrical conductivity coated with a surfactant prior to chopping, and having a resistivity of about $0.5 \times 10^{-3}$ to $2.0 \times 10^{-3}$ ohm cm.

11. Carbon fibres according to claim 10 wherein the surfactant comprises an anionic surfactant.

12. Carbon fibres according to claim 11 wherein the surfactant comprises dioctyl sulphosuccinate and ethanol.

13. Carbon fibers according to claim 10, comprising chopped bundles of filaments.

14. Carbon fibers according to claim 10, in the form of an electrode for an accumulator or cell.

15. Chopped crystal carbon fibers for enhancing electrical conductivity coated with a surfactant prior to chopping, said fibers being flowable and being dispersible in water.

16. Carbon fibres according to claim 15 wherein the surfactant comprises an anionic surfactant.

17. Carbon fibres claim 16 wherein the surfactant comprises dioctyl sulphosuccinate and ethanol.

18. Carbon fibers according to claim 15, comprising chopped bundles of filaments which are dispersible in water into said filaments.

19. Carbon fibers according to claim 15, in the form of an electrode for an accumulator or cell.

* * * * *